April 12, 1938.   L. BEHR   2,113,928
MEASURING APPARATUS
Original Filed Dec. 4, 1933   3 Sheets-Sheet 1
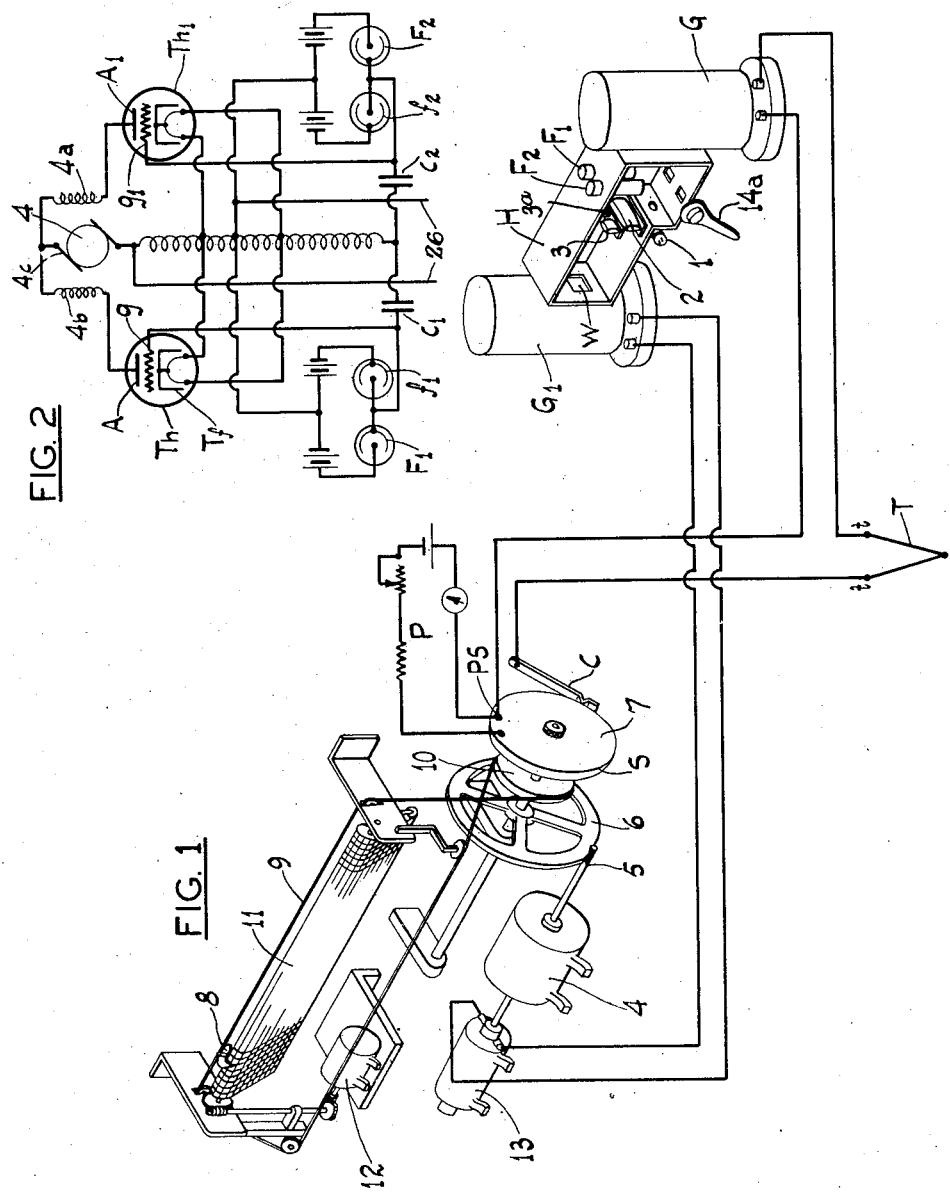
INVENTOR
Leo Behr April 12, 1938.   L. BEHR   2,113,928
MEASURING APPARATUS
Original Filed Dec. 4, 1933   3 Sheets-Sheet 2
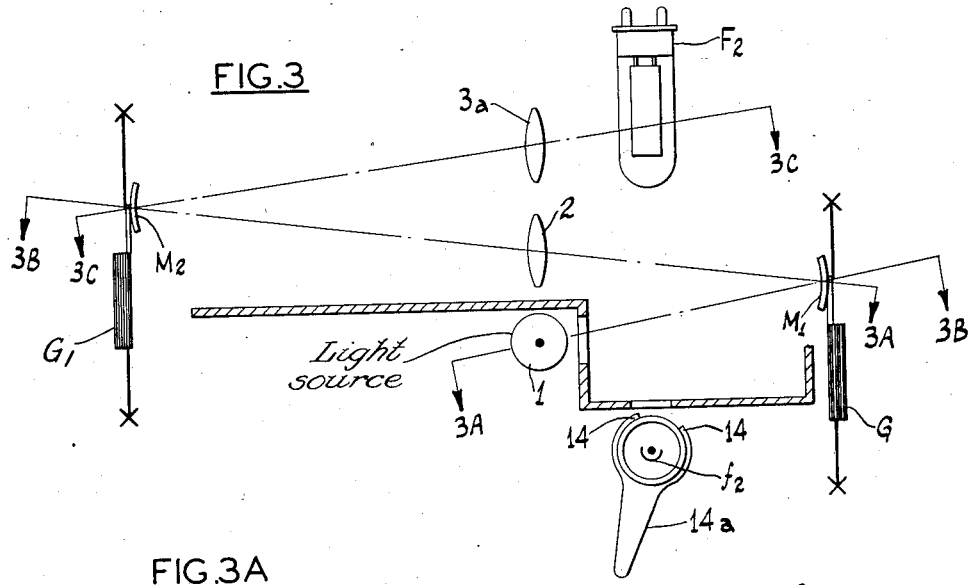
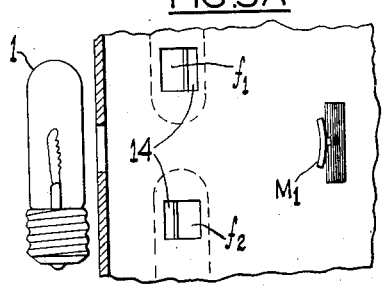
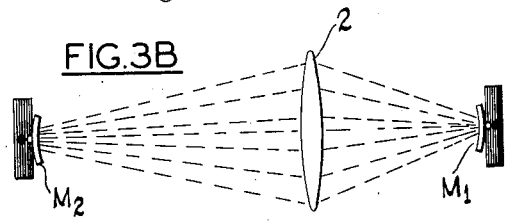
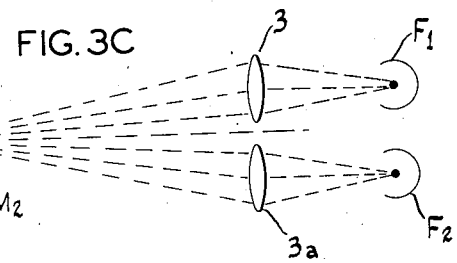
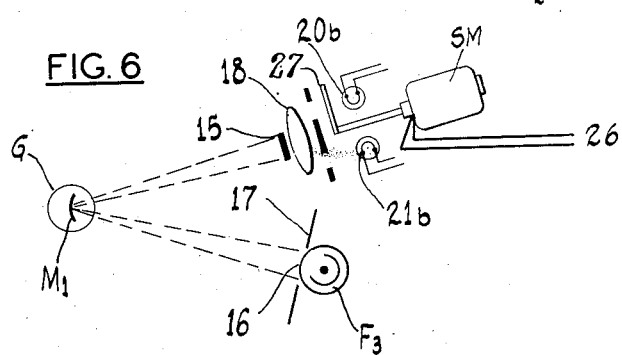
Leo Behr
INVENTOR April 12, 1938.                L. BEHR                2,113,928
                        MEASURING APPARATUS
            Original Filed Dec. 4, 1933    3 Sheets-Sheet 3

Leo Behr
INVENTOR

Patented Apr. 12, 1938

2,113,928

UNITED STATES PATENT OFFICE 2,113,928

MEASURING APPARATUS

Leo Behr, Glenside, Pa., assignor to Leeds & Northrup Company, Philadelphia, Pa., a corporation of Pennsylvania Application December 4, 1933, Serial No. 700,934
Renewed August 4, 1937

8 Claims. (Cl. 250—41.5)

My invention relates to systems for determining or measuring the magnitude or changes of magnitude of a condition, such as an electrical, physical, chemical or other condition, and more particularly in which a record or control is made or effected in response to the determination or measurement.

In accordance with one aspect of my invention, the change in magnitude of the condition under measurement produces unbalance in response to which an element or structure of the system is actuated, as by a motor, to restore balance. The rate at which rebalance is effected is determined jointly by the unbalance of the system and an effect proportional to the speed of rebalance; more specifically, an electromotive force whose magnitude is proportional to the speed of rebalancing is utilized to limit the speed of the rebalancing motor.

More particularly, the system for controlling the rebalancing motor includes two responsive devices, one responsive to unbalance between a standard effect and an effect varying with change of the condition under measurement and the other responsive to the speed of the motor; more specifically, in one modification of the invention, the two responsive devices are reflecting galvanometers which jointly determine the path of a beam of light utilized to control the motor.

My invention resides in the features of combination and arrangement hereinafter described and claimed.

Figure 4:
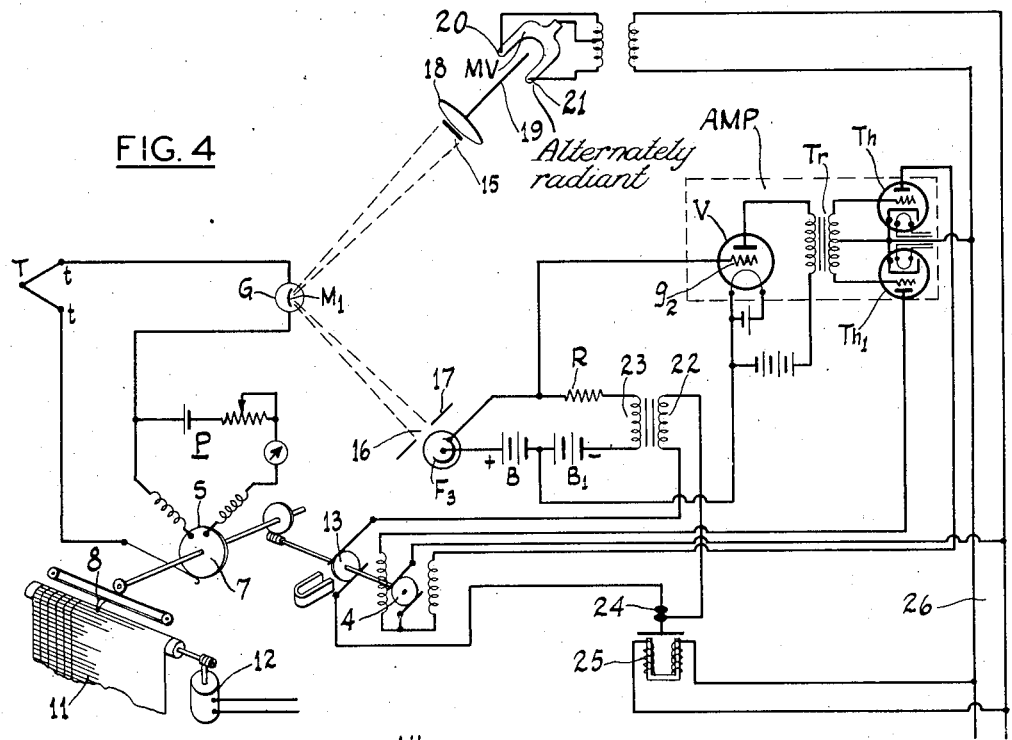
Figure 5:
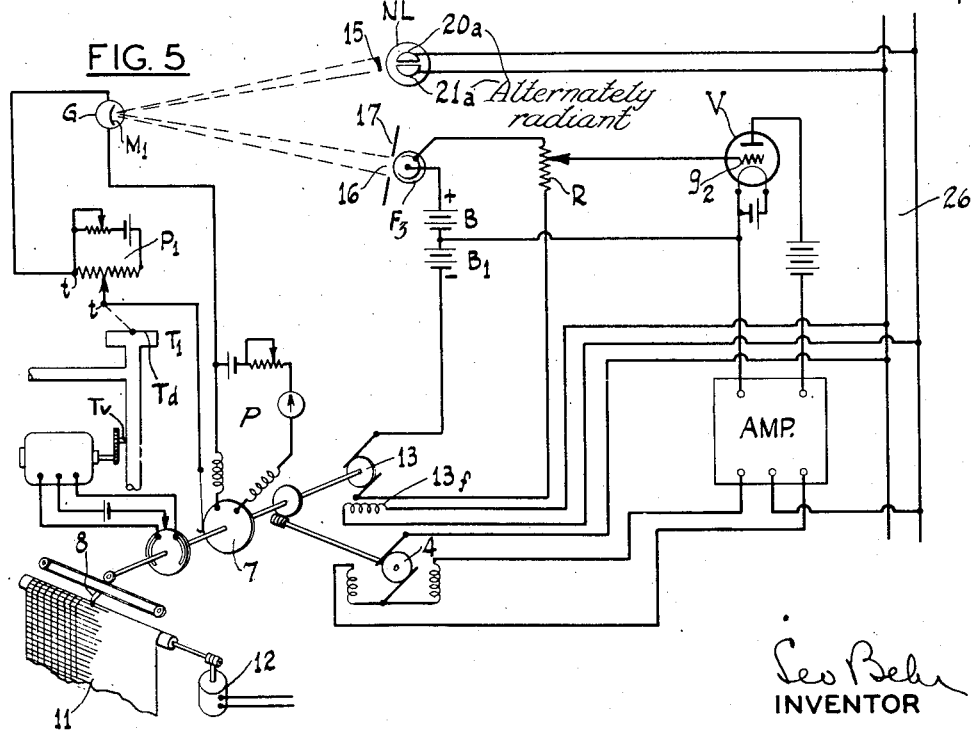

For an understanding of my invention and for illustration of several forms thereof, reference is to be had to the accompanying drawings in which:

Figure 1 diagrammatically illustrates a recording system;

Fig. 2 is a wiring diagram of the control circuit of a motor shown in Fig. 1;

Fig. 3 diagrammatically, and on enlarged scale, illustrates the optical system shown in Fig. 1;

Figs. 3A, 3B, and 3C are detail views taken, respectively, on lines 3A, 3B, and 3C of Fig. 3;

Figs. 4 and 5 diagrammatically illustrate other systems utilizing the invention.

Fig. 6 illustrates diagrammatically an arrangement for obtaining light impulses.

Referring to Fig. 1, the measuring circuit therein specifically illustrated comprises the potentiometer circuit P having a slide wire S rotatable with respect to the slide wire contact C. The galvanometer G is connected between the slide wire contact C and one terminal of the slide wire S in series with the device T responsive to changes in the condition under measurement, which specifically is shown as a thermocouple for measuring temperature. It is to be understood, of course, that the nature of the responsive device will depend upon the character of the condition being measured.

When the system is balanced; i. e., when the potential across the terminals $t$, $t$ of the responsive device T is equal and opposite to the potential drop across that part of the slide wire between the contact C and terminal PS, the movable element of the galvanometer is in its neutral position. Under this circumstance, a beam of light from the source $l$, as more clearly shown in Fig. 3, is reflected by the mirror MI, or movable element, of galvanometer G at such an angle that after passing through the lens 2 it is reflected, as more clearly shown in Fig. 3 and 3C, by the mirror M2 of a second galvanometer, whose purpose and function will be hereinafter described, and reflected along a path between lenses 3 and 3a.

Assuming that the system is unbalanced because of increase or decrease of the magnitude of the condition under measurement, the galvanometer deflects in one direction or the other, depending upon the sense of the change, so that the beam from the light source $l$ is reflected by mirror MI of galvanometer G at a different angle and, therefore, as reflected by the mirror M2 it strikes one or the other of the lenses 3, 3a and is deflected thereby onto the associated photoelectric cell F1, or F2. At this point, it is to be noted that the mirrors MI, M2 are at conjugate foci of lens 2 and likewise each of the lenses 3, 3a has conjugate foci at mirror M2 and the corresponding photo-electric cell F1 or F2.

The motor 4 (Fig. 1) is energized in one direction or the other depending upon which of the photo-electric cells F1, F2 receives the light beam, as hereinafter described, and through suitable driving connections, as gears 5 and 6, rotates the slide wire disk 7 in proper direction to restore the balance of the system. Simultaneously, the indicator or recorder stylus 8 or equivalent, by the cable 9 and pulley 10, is moved with respect to the chart or scale 11 driven from the continuously operating motor 12. In addition or alternatively, the motor 4 may be used to effect movement of other controlled structure, for example, a valve or rheostat regulating supply of energy to which T responds.

The motor 4 is mechanically coupled to the magneto or generator 13 whose terminals are connected to the second galvanometer G1 to impress thereon a voltage which is proportional to the speed of the motor 4 and, therefore, proportional to the speed of rebalancing of the system by the adjustment of slide wire S'. Preferably, and usually, the period of the second galvanometer G₁ is very short compared to the period of the galvanometer G.

Referring to Figs. 3 and 3A to 3C, it will be seen that both mirrors M1, M2 of the galvanometers G and G₁ jointly determine the ultimate position of the light beam so that if the rate of rebalancing is too high, the light beam will be transferred from one to the other of the photocells to reverse the current supply of the motor, while conversely if it is too low, a reverse action is effected.

During rebalancing, the mirror M2 rapidly shifts the beam back and forth between the two photo-cells so that the integrated current impulses supplied to the motor are in the direction to effect rebalancing, and progressively decrease as balance is approached. Usually, the motor 4 does not actually reverse as the beam shifts from one cell to the other, due to the relatively high momentum of the moving system, including its armatures and parts driven thereby, but the current impulses supplied in the opposite direction when the rate of rebalancing is too high serve to brake or check the speed of the motor.

Notwithstanding the intermittent energization of the motor during rebalancing, the curve traced by the recorder stylus is smoothly continuous. The time for rebalancing is very short even for the largest variations within the range of the instrument, and there is relatively little difference in the time required for balance as between large and small deflections, since the larger the deflection, the higher the speed at which the balancing action is begun. Notwithstanding the shortness of the time for rebalancing, there is no tendency to overshoot as the speed of the motor is continuously and progressively reduced as the system approaches balance.

A suitable motor control circuit is shown in detail in Fig. 2. The motor 4 is provided with two field coils 4a, 4b each having a terminal in common with the motor brush 4c and whose other terminals are connected to the anodes A, A1 of the grid controlled gaseous discharge tubes Th, ThI. The other brush of the armature and the common cathode connection of the tubes Th, ThI are connected across a suitable source of alternating current 26. The grids g, g1 of the tubes Th, ThI are connected respectively to the photoelectric cells F1, F2, so that when light falls upon cell F1, for example, the grid g of tube Th becomes sufficiently positive to allow current to flow from its anode A to its cathode Tf, completing a path through the field winding 4b of the motor 4 and effecting, or tending to effect rotation of the motor 4 in one direction. Conversely, when the light beam strikes the cell F2, current impulses will flow through the winding 4a of the motor effecting, or tending to effect rotation of the motor 4 in reverse direction. While I prefer to use grid controlled gaseous discharge tubes, other thermionic tubes may be used.

Referring again to Fig. 1, the lenses 2, 3, and 3a and the photo-electric cells F1 and F2 of the electro-optical portion of the complete system are disposed within the housing H which is made as light-proof as possible. In Fig. 1, the front cover has been removed to allow the interior of the housing to be viewed. At its opposite ends, the housing is provided with windows W, only one of which is visible, in register with the mirrors of the galvanometers G and G1.

To compensate for any stray light, there are provided the two photo-electric cells f1, f2 (Figs. 2, 3, 3A) connected in opposition to the main photo-cells F1, F2, respectively. The amount of light falling on these cells is variable as by a shutter 14 operable by handle 14a so that the effect of any stray light upon the cells F1 and F2 may be counteracted or compensated for by the auxiliary photo-cells f1, f2. The shutter 14 is constructed so that as the light permitted to fall on one of cells f1, f2, is increased, the amount of light permitted to fall on the other cell is decreased.

In the modification shown in Fig. 4, only one photo-electric cell and one galvanometer is utilized. The galvanometer G, as in the prior modification, responds to unbalance of a measuring system including a resistance which is adjustable to rebalance the system. The sense of direction of the deflection depends upon the sense of change of the condition under measurement. When the galvanometer is in its neutral position, the image of the opaque target 15 fills the orifice or window 16 of the plate 17 in front of photo-electric cell F3. On the side of target 15 opposite galvanometer G is a lens 18 from which extends a barrier 19 and on opposite sides of the barrier are the light sources 20, 21, specifically branches of a mercury vapor lamp or the like, which are alternately energized. For example, they are connected to a source of alternating current and are so poled that one flashes for the positive impulses and the other for the negative impulses of the current. The usual 60-cycle current used for lighting and power purposes is satisfactory. Due to persistence of vision, both tubes 20, 21 appear to be continuously lighted with current of this frequency, but actually, as can readily be determined by known means, they are alternately luminous and dark.

Accordingly, if the galvanometer G deflects in one direction, it receives light from source 20, and if it deflects in the opposite direction it receives light from the source 21, and in either case it reflects the light impulses to the photo-electric cell F3 through window 16 to produce voltage impulses on the grid g2 of a thermionic amplifier, the amount of light entering the window depending upon the extent of the deflection. The amplifier output is fed into grid controlled gaseous discharge tubes or the like arranged in push-pull. One or more amplifier tubes may be included between tube V and the tubes Th, ThI, suitable coupling means, as transformers, being provided to couple the tubes. In the simplified diagram shown, the transformer Tr couples the plate circuit of tube V to the input circuit of the final amplifier stage. The connections of the motor 4 in the output circuit of the final amplifier are substantially the same as described in connection with Fig. 2.

When the galvanometer G is in neutral position there is no input to the amplifier, and current does not flow through either of the tubes Th, ThI. The motor, therefore, remains stationary. The grid g2 is negatively biased under this circumstance by the section B1 of the anode battery B, or equivalent, of the photo-electric cell. When, however, galvanometer G deflects in one direction or the other, light impulses are received by the photo-electric cell and current flows through resistance R so that voltage impulses of magnitude determined by the extent of deflection are impressed upon the input circuit of the amplifier, as above stated. The phase relation between these impulses and the alternating current voltage supplied to the final amplifier anode circuit is dependent upon the sense of deflection of galvanometer G; i. e., when the galvanometer G deflects in one direction, the grid $g2$ is positive when the anode of one of the tubes $Th$, $ThI$ is positive with respect to its cathode, and for an opposite deflection of galvanometer G the grid $g2$ of the amplifier is positive when the anode of the other final amplifier tube is positive with respect to its cathode. The instantaneous voltages on the grids of tubes $Th$, $ThI$, due to current impulses through R, are always of opposite polarity and which of those grids is positive when its associated anode is positive is determined by which of light sources 20, 21 produces the current impulses through R. Which of the fields of the motor 4 is energized, therefore, depends primarily upon the sense of deflection of the galvanometer G. As in the prior modification, energization of the motor effects rebalancing adjustment of the potentiometer slide-wire, the galvanometer G following the approach to balance to cause the image of target 15 to more and more fill the window 16.

If it is desired to effect a speed of rebalancing proportional to the unbalance, a voltage proportional to the speed of rebalancing can be introduced into the input circuit of the amplifier AMP. In the system specifically illustrated, the generator 13 is connected to the primary 22 of a transformer whose secondary 23 is included in the input circuit of the amplifier. Included in series with the primary 22 is a variable resistance or circuit-interrupting device 24 whose operating coils 25 are connected to the source 26 of alternating current which supplies the light to the sources 20, 21 and the tubes of the final amplifier stage.

During the rebalancing, when the voltage of secondary 23, substantially proportional to the speed of rebalancing, is in excess of the potential drop across R, due to the photo-electric cell current, which is proportional to the extent of unbalance, the magnitude and phase of their resultant is such that current impulses are not supplied to the motor, or, if supplied, are of such polarity as to tend to reduce the motor speed. When the voltage, due to generator 13, falls below the voltage due to the photo-electric cell, the reverse action occurs to speed up the motor, the predominance rapidly shifting from one voltage to the other as both voltages are reduced by the rebalancing adjustment. As in the prior modification, the rate of rebalancing is thus progressively decreased as balance is approached, and at such rate as to maintain a substantially constant ratio between the speed of rebalancing and the extent of unbalance.

The modification shown in Fig. 5 is, in general, similar to that of Fig. 4 and the same reference characters are used to designate like elements. The most significant differences are that the armature of the generator 13 is directly included in the input circuit of the amplifier V instead of indirectly through a transformer, and that the chopper 24, or equivalent, is omitted. The generator field $13f$ is energized with alternating current from source 26. As in the modification of Fig. 4, the generator 13 therefore introduces into the amplifier input circuit a voltage whose amplitude is proportional to the speed of rebalancing and which, with a voltage produced by the photo-electric cell 13, determines the speed of the motor 4 which operates the slide wire drum 7 or equivalent.

The two light sources $20a$, $21a$ are electrodes of a single tube and alternately glow in synchronism with impressed voltage. They are interchangeable with the lens 18, barrier 19 and lights 20, 21 of Fig. 4.

In this modification, the responsive device $TI$ is a pressure responsive device controlling a second potentiometer $PI$ so that the potential across terminals $t, t$ is determined by the pressure on diaphragm $Td$ or equivalent, and the structure controlled by motor 4 includes valve $Tv$ whose adjustment regulates the flow of a fluid whose pressure acts on diaphragm $Td$.

So long as the condition, specifically pressure, remains of desired magnitude, motor 4 remains inactive. Upon increase or decrease of pressure, the measuring network P is unbalanced so that galvanometer G deflects one way or the other in accordance with the sense of the change and to an extent proportional to the change. Accordingly, light from one or the other of the sources $20a$, $21a$ depending upon the sense of deflection of G, is reflected by mirror $M1$ to the photo-cell, the greater the deflection, the greater the amount of light received by the cell. One or the other of the fields of motor 4 is thereupon energized to effect rotation of the slide wire disc in the proper sense to restore balance and, as the balancing progresses, the angle of deflection of mirror G and, therefore, the light received by the photo-electric cell becomes less and less.

The voltage produced by generator 13 is continuously balanced against the voltage produced by the photo-electric cell; i. e., if the speed of motor 4 is so high as to effect excessively high rate of rebalancing, the generator voltage predominates or overcomes the voltage due to unbalance of the measuring circuit so that grid $g2$ does not effect control of the final amplifier; i. e., the grid does not swing sufficiently positive to permit anode current of tube $Th$ or $ThI$ to flow, whereupon the motor slows down until the photo-electric cell voltage again predominates, this regulating action continuing as the motor moves the slide wire toward the new position of balance.

In Fig. 6 is illustrated an arrangement for producing light impulses of opposite phase for selection by the mirror of galvanometer G, which arrangement may be used in the systems of Fig. 4 or Fig. 5. Instead of the mercury vapor light MV of Fig. 4, or the neon, or equivalent, glow lamp NL of Fig. 5 are used the incandescent lamps $20b$, $21b$ which are continuously energized. The revolving shutter 27 driven by the synchronous motor SM permits one light to be exposed for alternations of one polarity of source 26 and the other light to be exposed for the alernations of opposite polarity. For one sense of deflection of galvanometer G, the mirror $M_1$ reflects the light impulses from one of the lamps to photo-electric cell F3 and for opposite sense of deflection reflects the light impulses from the other lamp to the photo-electric cell. The greater the deflection of the mirror $M_1$, the greater the illuminated area viewed by it for reflection of a greater amount of light to photo-electric cell F3. As in the modifications of Figs. 4 and 5, when the galvanometer is in neutral position, the image of the opaque screen 15, as reflected by mirror M₁, fills the window 16 of the photo-electric cell screen 17.

With all of the foregoing systems, high speed recording is obtained. By way of example, for a change corresponding to the maximum range of the measuring system, the system can be balanced in less than two seconds and without overshooting. The high speed is obtained without sacrifice of sensitivity or accuracy of the measuring system and the zero or neutral of the entire system is stable and independent of photo-electric cell and amplifier characteristics.

What I claim is:

1. A normally balanced control system comprising means for producing upon unbalance an effect of magnitude determined by the magnitude of change of a condition under measurement, structure adjustable to rebalance the system, a motor for adjusting said structure, and an electro-optical system for controlling the energization and speed of the motor including photo-cells, means for producing a beam of radiant energy, and means for determining the path of said beam for selective energization of said cells comprising means responsive to the sense and extent of unbalance of said system and means responsive to the speed and direction of rotation of said motor.

2. A control system comprising an electrical network unbalanced upon change in magnitude of a condition, an impedance adjustable to rebalance said network, a motor for adjusting said impedance, a generator driven by said motor to produce a voltage proportional to the speed of rebalancing of said network, a galvanometer responsive to unbalance of said network, a galvanometer connected to said generator, and means for controlling said motor by said galvanometers jointly.

3. A control system comprising an electrical network unbalanced upon change in magnitude of a condition to produce a voltage whose magnitude is determined by the extent of unbalance, an impedance adjustable to rebalance said network, a motor for adjusting said impedance, a generator driven by said motor to produce a voltage proportional to the speed of rebalancing of said network, a reflecting galvanometer responsive to unbalance of said network, a reflecting galvanometer connected to said generator, photo-cells for selectively determining the direction of current supplied to said motor, and means for producing a beam of light reflected by said galvanometers alternately from one to the other of said cells during unbalance of said network in accordance with the sense of difference of said voltages as they both are reduced toward zero by the rebalancing.

4. A normally balanced control system unbalanced upon change in magnitude of a measured condition, a mirror displaced in accordance with the unbalance of said system, a photo-cell, alternately energized sources of light whose beams are selectively transmitted to said photo-cell by said mirror upon unbalance of said system depending upon the sense of the unbalance, structure for rebalancing said system, and a motor for adjusting said structure, and means for controlling said motor including said photo-cell and means for effecting rotation thereof in one direction or the other depending upon which of said beams is reflected to said photo-cell.

5. A normally balanced system unbalanced upon change in magnitude of a measured condition, structure adjustable to rebalance said system, a motor for adjusting said structure having windings energized by periodically varying current, a photo-cell, sources of light alternately energized and whose beams are selectively transmitted to said photo-cell depending upon the unbalance of said system, means for amplifying the output of said photo-cell to supply current to one of the motor windings whose phase relation with respect to the current in another of said windings is determined by the unbalance of said system to effect rotation of said motor in a sense to restore balance, a generator driven by said motor, and means for introducing the voltage generated thereby into said amplifying means whereby the speed of said motor is determined jointly by the unbalance and rate of rebalancing of said system.

6. A normally balanced system unbalanced upon change in magnitude of a measured condition, structure adjustable to rebalance said system, a motor for adjusting said structure having windings energized by periodically varying current, a photo-cell, sources of light alternately energized and whose beams are selectively transmitted to said photo-cell depending upon the unbalance of said system, means for amplifying the output of said photo-cell to supply current to one of the motor windings whose phase relation with respect to the current in another of said windings is determined by the unbalance of said system to effect rotation of said motor in a sense to restore balance, a direct-current generator driven by said motor, means for varying the resistance of the generator circuit at the frequency of energization of said light sources, and a non-conductive reactive coupling between said generator circuit and the input circuit of said amplifier whereby the speed of said motor is determined jointly by the unbalance and speed of rebalancing of said system.

7. A normally balanced system unbalanced upon change in magnitude of a measured condition, structure adjustable to rebalance said system, a motor for adjusting said structure having windings energized by periodically varying current, a photo-cell, sources of light alternately energized and whose beams are selectively transmitted to said photo-cell depending upon the unbalance of said system, means for amplifying the output of said photo-cell to supply current to one of the motor windings whose phase relation with respect to the current in another of said windings is determined by the unbalance of said system to effect rotation of said motor in a sense to restore balance, a generator driven by said motor having its field energized by alternating current of frequency corresponding to the frequency of alternate energization of said light sources and its output voltage impressed on the input circuit of said amplifier whereby the speed of said motor is controlled jointly in accordance with the unbalance and speed of rebalance of said system.

8. A control system comprising a system unbalanced upon change in magnitude of a condition, means adjustable to rebalance said system, a motor for adjusting said means, means producing a force varying as a function of rate of adjustment of said means by said motor, deflecting means responsive to the unbalance of said system, deflecting means responsive to said force, and means for controlling said motor controlled by said deflecting means jointly.

LEO BEHR.